(12) United States Patent
Cohen et al.

(10) Patent No.: US 10,331,800 B2
(45) Date of Patent: *Jun. 25, 2019

(54) SEARCH RESULTS MODULATOR

(71) Applicant: Bublup, Inc., Arlington, VA (US)

(72) Inventors: Alain J. Cohen, McLean, VA (US);
Marc A. Cohen, McLean, VA (US);
Alberto Morales, Reston, VA (US);
Benjamin Miller, Manassas, VA (US)

( * ) Notice: Subject to any disclaimer, the term of this patent is extended or adjusted under 35 U.S.C. 154(b) by 32 days.

This patent is subject to a terminal disclaimer.

(21) Appl. No.: 15/462,425

(22) Filed: Mar. 17, 2017

(65) Prior Publication Data

US 2017/0193065 A1    Jul. 6, 2017

Related U.S. Application Data

(63) Continuation of application No. 15/178,842, filed on Jun. 10, 2016, now Pat. No. 9,626,445.

(60) Provisional application No. 62/174,805, filed on Jun. 12, 2015.

(51) Int. Cl.
*G06F 17/30* (2006.01)

(52) U.S. Cl.
CPC .... *G06F 17/30554* (2013.01); *G06F 17/3053* (2013.01); *G06F 17/3056* (2013.01); *G06F 17/30477* (2013.01); *G06F 17/30867* (2013.01)

(58) Field of Classification Search
CPC ......... G06F 17/30554; G06F 17/30477; G06F 17/3053; G06F 17/3056; G06F 17/30867
See application file for complete search history.

(56) References Cited

U.S. PATENT DOCUMENTS

| | | | |
|---|---|---|---|
| 8,219,558 B1* | 7/2012 | Trandal | G06Q 10/087 707/736 |
| 8,719,286 B1* | 5/2014 | Xing | G06F 11/1451 707/755 |
| 2008/0235608 A1* | 9/2008 | Prabhu | G06F 17/30867 715/765 |
| 2009/0003800 A1* | 1/2009 | Bodin | G06F 17/30 386/285 |
| 2009/0119257 A1* | 5/2009 | Waters | G06F 17/30327 |
| 2012/0191684 A1* | 7/2012 | Epstein | G06F 17/30864 707/706 |
| 2013/0104088 A1* | 4/2013 | Santos-Gomez | G06F 17/30994 715/854 |
| 2013/0198212 A1* | 8/2013 | Akita | G06F 17/30477 707/758 |
| 2014/0108436 A1* | 4/2014 | Vishria | G06F 17/30867 707/754 |
| 2015/0161139 A1* | 6/2015 | Wang | G06F 17/3053 707/735 |

(Continued)

*Primary Examiner* — Noosha Arjomandi

(57) ABSTRACT

When a user conducts a search for content using one or more of the many search engines known in the art, embodiments of the present invention may receive results returned to the user's browser by the search engine, and may then proceed to filter, organize, modify, or enhance those results and/or their presentation by performing various editing and/or presentation operations on the search results, based on information relating to the user's prior interactions with the search results and the user's interests and preferences. Search results may also be modulated based on information about the way other users have responded to or interacted with each of the search results in the past.

38 Claims, 5 Drawing Sheets

(56) References Cited

U.S. PATENT DOCUMENTS

| | | | | |
|---|---|---|---|---|
| 2015/0324468 A1* | 11/2015 | Okamoto | .......... | G06F 17/30867 |
| | | | | 707/706 |
| 2016/0125036 A1* | 5/2016 | Hanson | .................. | H04L 67/30 |
| | | | | 707/733 |
| 2016/0148264 A1* | 5/2016 | Winstanley | ........ | G06Q 30/0257 |
| | | | | 705/14.55 |

* cited by examiner

SEARCH RESULTS MODULATOR

CROSS-REFERENCE TO RELATED APPLICATIONS

This application is a continuation of U.S. patent application Ser. No. 15/178,842, filed Jun. 10, 2016, which claims priority under 35 U.S.C. § 119(e) to United States Provisional Patent Application No. 62/174,805, entitled "Search Results Modulator," filed Jun. 12, 2015.

FIELD OF THE INVENTION

Embodiments of the present invention relate to systems and methods for presenting and interacting with search results received from an Internet search engine. More particularly, embodiments of the present invention relate to systems and methods for performing editing or various presentation-related operations on search results received from a search engine before the search results are delivered to a user's browser.

BACKGROUND

A great number of new applications and websites leverage the breadth of the World Wide Web to deliver requested or desirable information to users, and many of them do so with the help of popular search engines. Despite the availability of a vast wealth of user information, conventional search engines fail to meaningfully incorporate this information into the display of search results. For example, search engine users regularly repeat the same searches over time, or they perform similar searches comprising overlapping search results. Existing search engines, however, do not incorporate information about the users' prior interactions with their search results. They do not remember which results users liked, disliked, found useful, etc. As a result, users may be forced to unnecessarily repeat their research efforts.

User information, in this context, may include individual user interactions, interests and preferences, as well as the collective interactions, interests, and preferences of many users. User information may also include, for example, identifications of particular web pages, documents, or other information resources that users believe are useful or interesting. Similarly, user information may include identifications of information resources that users believe are not useful or interesting. Further, user information may include semantic information about information resources that associates certain resources with other related information resources. For example, co-pending U.S. patent application Ser. No. 14/664,166, entitled "Deriving Semantic Relationships Based on Empirical Organization of Content by Users," describes embodiments for deriving semantic relationships among information resources based on user actions.

It would be beneficial if users could interface with popular search engines in a manner that more precisely leverages user information to identify, filter, modify, and present search results in a more productive manner.

SUMMARY OF THE INVENTION

This summary is provided to introduce certain concepts in a simplified form that are further described below in the Detailed Description. This summary is not intended to identify essential features of the claimed subject matter, nor is it intended to limit in any way the scope of the claimed invention.

Embodiments of the present invention are directed to methods of capturing, filtering, enhancing, modifying, organizing, presenting, and interacting with search results received from an Internet search engine. For purposes of this description, "search results" means the set of content items (e.g., web pages, documents, images, videos, etc.) that is returned to a user from a search engine as a result of a query. Each content item in the set may be individually selected by a user for further study. The invention includes a search results modulator, which, according to some embodiments, interfaces with a browser framework (also referred to as a "browser") and modulates the display of search results received from a search engine.

When a user conducts a search for content using one or more of the many search engines known in the art, embodiments of the present invention may receive results returned to the user's browser by the search engine, and may then proceed to filter and enhance those results and/or their presentation by performing various editing and/or presentation operations on the search results, based on information relating to the user's prior interactions with the search results and the user's interests and preferences (which may, for example, include results the user likes, dislikes, etc.). Search results may also be modulated based on information about the way other users have responded to or interacted with each of the search results in the past.

Some embodiments may perform editing and/or presentation operations before search engine results are delivered to a user's browser.

Other embodiments may perform editing and/or presentation operations after search engine results are delivered to a user's browser, possibly in the same window. For example, the search results can be rewritten in place.

Still other embodiments may perform editing and/or presentation operations after search engine results are delivered to a user's browser, but not in the same window.

The above summaries of embodiments of the present invention have been provided to introduce certain concepts that are further described below in the Description of the Embodiments. The above-summarized embodiments are not necessarily representative of the claimed subject matter, nor do they span the scope of features described in more detail below. They simply serve as an introduction to the subject matter of the invention.

BRIEF DESCRIPTION OF THE DRAWINGS

So the manner in which the above recited summary features of the present invention can be understood in detail, a more particular description of the invention may be had by reference to embodiments, some of which are illustrated in the accompanying drawings. It is to be noted, however, that the accompanying drawings illustrate only typical embodiments of this invention and are therefore not to be considered limiting of its scope, for the invention may admit to other equally effective embodiments.

DESCRIPTION OF THE EMBODIMENTS

Figure 1:
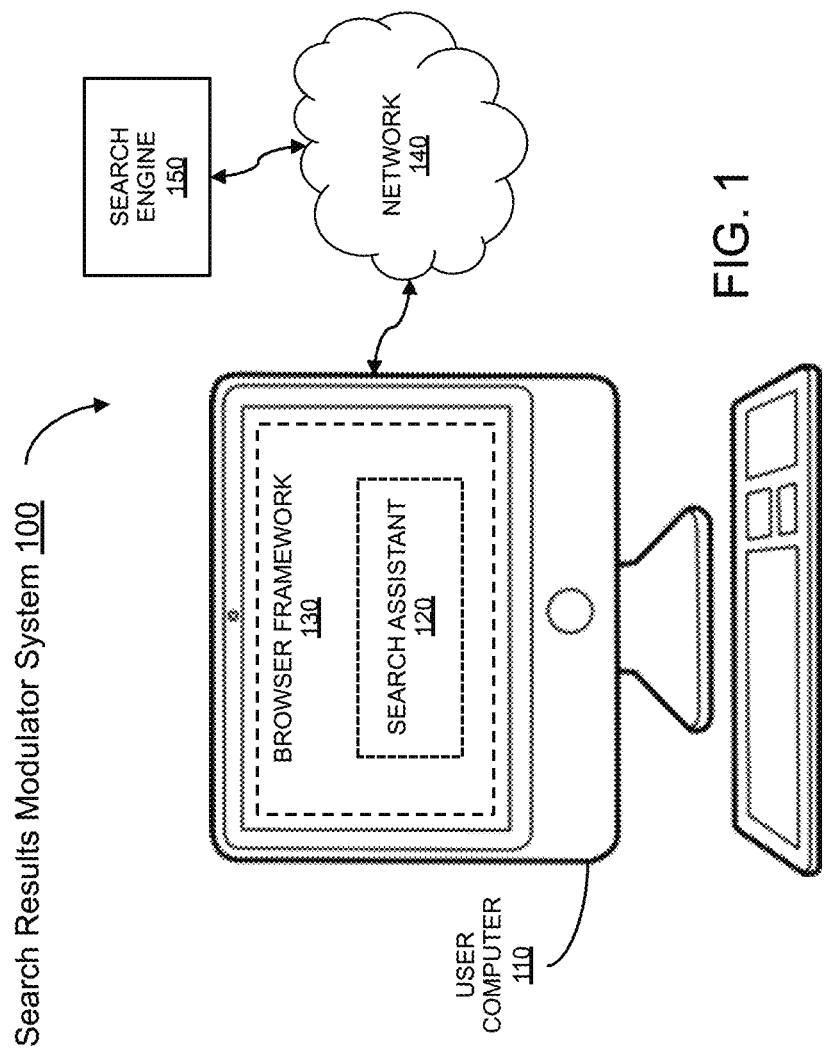
FIG. 1 is a high-level block diagram of an exemplary embodiment of a search results modulator, in accordance with the present invention.

Embodiments of the present invention will be described with reference to the accompanying drawings, wherein like parts are designated by like reference numerals throughout, and wherein the leftmost digit of each reference number refers to the drawing number of the figure in which the referenced part first appears.

Software Architecture

FIG. 1 is a high-level block diagram of an exemplary embodiment of a search results modulator, in accordance with the present invention. The search results modulator system 100 may include a user computer 110, which may be any type of capable computing device, including a desktop computer, laptop computer, mobile phone, tablet, or any other suitable computing device described with respect to FIG. 5. User computer 110 may include a browser framework 130, which may be a web browser (e.g., any conventional web browser such as Microsoft Internet Explorer, Google Chrome, Mozilla Firefox, Apple Safari, etc.), a browser of other types of information (e.g., a file system browser such as Windows Explorer or Apple Finder), or some other application (e.g., a desktop or mobile application) capable of searching for information, retrieving results, and displaying the results to a user.

The Search Results Modulator System 100 may also include a search assistant 120. Search assistant 120 may comprise a software module (e.g., written in JavaScript or another programming language supported by browser framework 130), and it may run within browser framework 130 or it may run externally and interface with browser framework 130 using application program interfaces ("APIs") according to well-known techniques. Search assistant 120 may also be a permanent component of browser framework 130, or it may be temporarily installed into and uninstalled from browser framework 130 after executing (e.g., as a "plug-in," "add-on," or "extension"). Accordingly, search assistant 120 may be a software module that is separate and distinct from browser framework 130, or it may be partially or fully integrated with other functionality of browser framework 130. In an embodiment, search assistant 120 may load other software into browser framework 130 at runtime. For purposes of this description, such other software is considered a part of search assistant 120.

User computer 110 may be connected to network 140 (e.g., the Internet), which in turn may connect user computer 110 to search engine 150 (e.g., a search engine provided by Google, Microsoft, Yahoo, etc.).

In embodiments illustrated by FIG. 1, a user of user computer 110 may use browser framework 130 to conduct Internet searches using search engine 150. In response to Internet searches, search assistant 120 may receive results returned by search engine 150 and may filter and/or enhance those results and/or their presentations via browser framework 130. Such filtering and enhancing may include various editing and/or presentation operations on the search results based on the user's interests, preferences, and previous interactions with the search results.

Figure 2:
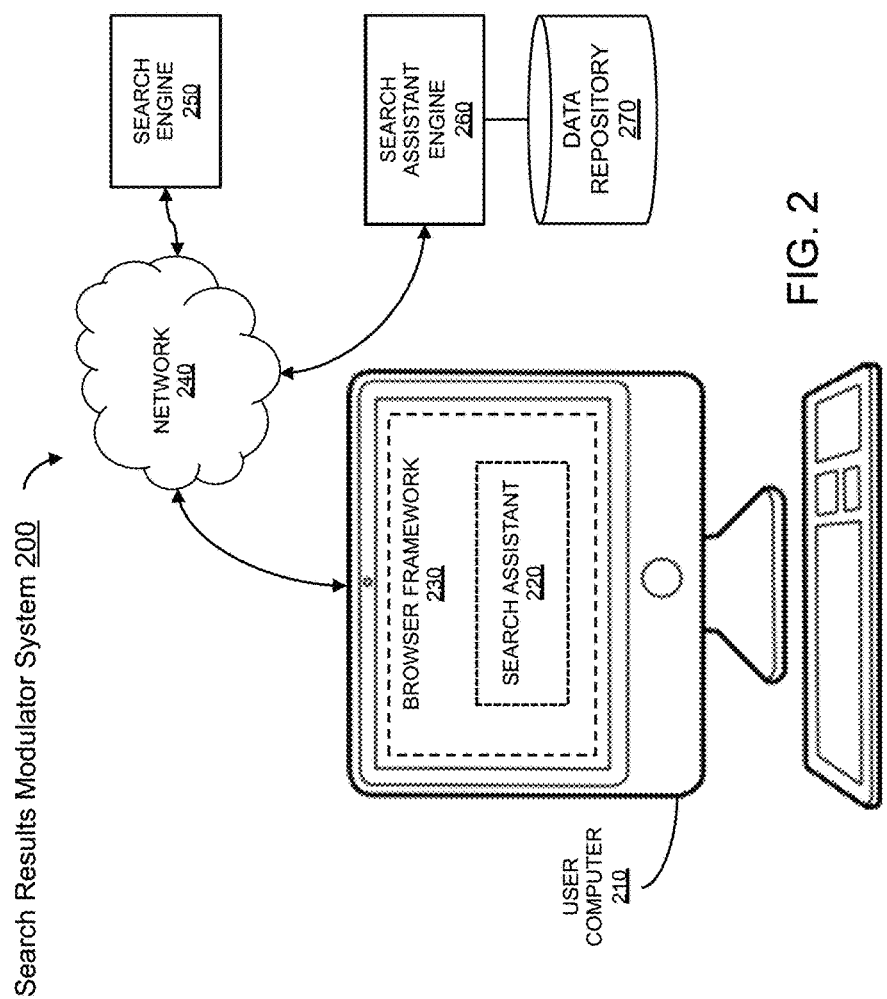
FIG. 2 is another high-level block diagram of an exemplary embodiment of a search results modulator, in accordance with the present invention.

FIG. 2 is another high-level block diagram of an exemplary embodiment of a search results modulator, in accordance with the present invention. Like search results modulator system 100, search results modulator system 200 may include a user computer 210, which may include a browser framework 230. Search results modulator system 200 may also include a search assistant 220.

User computer 210 may be connected to network 240, which in turn may connect user computer 210 to search engine 250. Network 240 may also connect user computer 210 to search assistant engine 260, which is connected to data repository 270.

Figure 5:
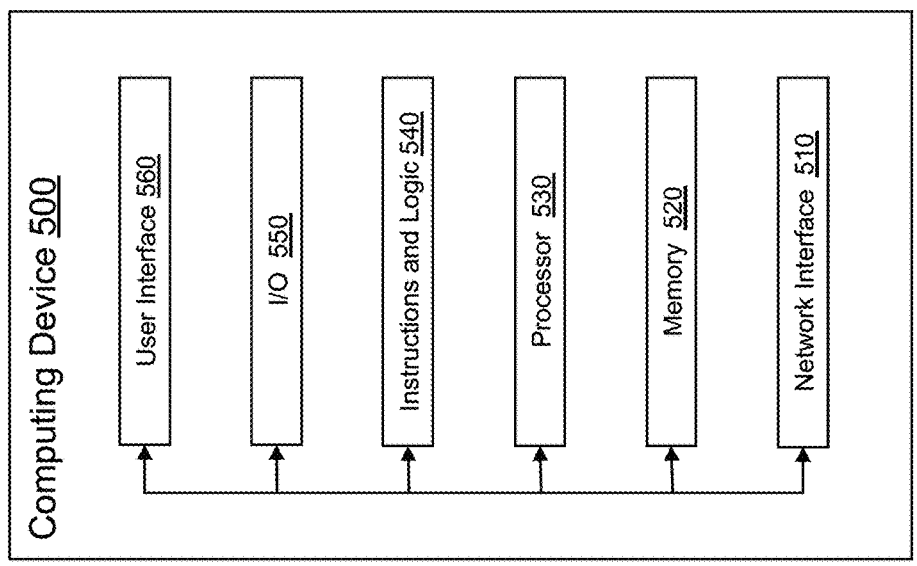
FIG. 5 is a block diagram of an exemplary embodiment of a computing device, in accordance with the present invention.

Search assistant engine 260 may reside on a server computer of the type described with respect to FIG. 5, may assist search assistant 220 with processing operations, and may provide additional information about search results to a user of search engine 250. Search assistant engine 260 may store additional information in data repository 270, which may include any type of data store (e.g., a relational database, NoSQL database, in-memory data store, etc.). In embodiments, data repository 270 may reside on the same server as search assistant engine 260, or on another server.

In embodiments illustrated by FIG. 2, a user of user computer 210 may use browser framework 230 to conduct Internet searches using search engine 250. Search assistant 220 may receive results returned by search engine 250 and filter and/or enhance those results and/or their presentations via browser framework 230. Such filtering and enhancing may include various editing and/or presentation operations on the search results based on the user's interests, preferences, and previous interactions with the search results.

The editing and/or presentation operations may also be based on prior interactions with the search results by other users. In such embodiments, search assistant 220 may query search assistant engine 260 for additional information based on the search results. Search assistant engine 260 may then retrieve the additional information from data repository 270 and transmit at least some of the information to search assistant 220 for processing. Further, when a user interacts with the search results, or indicates his interests or preferences, search assistant 220 may receive this information and transmit it to search assistant engine 260 for storage in data repository 270.

In embodiments, data repository 270 can store content items that have been uploaded and/or saved by users. For example, users may save search results to data repository 270 for later access and retrieval. Users may also upload other content items (i.e. content items not presented as search results) to data repository 270, and such content items may be used to supplement search results.

Having described several architectural embodiments of a search results modulator system, attention will now shift to the functionality of the search assistant (item 120 of FIG. 1 and/or item 220 of FIG. 2). Such functionality will be described with respect to three primary aspects: (1) how the search assistant receives (e.g., intercepts) search results; (2) how the search assistant presents, edits, and filters the search results; and (3) how the search assistant receives and stores additional information about the search results (e.g., user interactions).

Receiving/Capturing Search Results

In embodiments, search assistant 120 or 220 may interface with browser framework 130 or 230 (e.g., using conventional APIs) to capture search results received from search engine 150 or 250.

Before the search results are presented to the user, search assistant 120 or 220 may parse search results received by browser framework 130 or 230 to identify individual search results. As described below, search assistant 120 or 220 may also distinguish the search results from other information, such as advertisements, which may be received by browser framework 130 or 230 from search engine 150 or 250 or from search assistant engine 260.

Search assistant 120 or 220 may identify individual search results for several reasons. First, in order for some embodiments of the invention to operate on particular search results (e.g., by highlighting, hiding, or adding additional content to search results), at least some of the search results must be identifiable as distinct objects. In other words, embodiments of search assistant 120 or 220 may identify the information associated with one or more of the search results, and may then identify the graphical boundaries of those search results based on how they appear in the search results page, as described below. This may be especially complex where the graphical dimensions of search results vary according to, for example, the length of a URL, title, and/or textual description (snippet) included in each search result. Some search results may also include additional information, such as a thumbnail image, that search assistant 120 or 220 may also consider.

Second, in order to operate on particular search results based on stored information about the results, some embodiments must be able to uniquely identify the results in order to query a data repository such as data repository 270. In an embodiment, search assistant 120 or 220 may uniquely identify a search result by its uniform resource locator (URL). For example, co-pending U.S. patent application Ser. No. 14/664,166 describes embodiments for identifying content items (including search results) based on their URLs, and also for handling situations in which the same content item may have multiple URLs. Such techniques can also be used with this invention. In the same or an alternative embodiment, search assistant 120 or 220 may uniquely identify a search result according to its canonical tag. A canonical tag is a means by which web page authors may notify search engines and other tools that a primary URL identifies a web page, regardless of how many different URLs are associated with the same web page or content. For example, an author may insert the HTML tag, <link href="http://www.example.com/" rel="canonical"/> to indicate that the current URL and www.example.com (the "canonical URL") are associated with the same web page or content. Search assistant 120 or 220 may therefore interpret the canonical tag associated with a particular search result and then query data repository 270 based on the canonical URL.

In other embodiments, particularly non-Web embodiments, search assistant 120 or 220 may uniquely identify a search result according to some other component known in the art. For example, if a search result is a document, search assistant 120 or 220 can identify the document based on its pathname in a file system, or its title, author, and date, or a checksum (or similar value) computed based on the document's raw content.

In still other embodiments, the search assistant 120 or 220 may identify properties of individual search results (e.g., title, keywords, last modified date, etc.). In such embodiments, search assistant 120 or 220 does not need to uniquely identify the search results, but rather it can use certain properties of a search result to query a data repository such as data repository 270 or as a check against a set of rules. For example, search assistant 120 or 220 may be configured to operate on search results that contain certain words.

Depending on the type of data contained in a search result, and the information space from which the result is obtained, different methods for identifying a result and/or its properties will be applicable.

Parsing Search Results

Unfortunately, there is no singular convention for delivering search results as part of a search results page to browser framework 130 or 230. In other words, search results generally do not arrive from a search engine in individual packages or clearly demarcated segments. Instead, they are included in markup language instructions (e.g., HTML code) that instruct browser framework 130 or 230 to present search results and any additional information (e.g., advertisements) in a format that is specific to the search engine. The format may also be specific to browser framework 130 or 230.

Embodiments of the invention include at least two approaches for parsing the markup language instructions (hereinafter, the "markup") to identify individual search results and to graphically distinguish them from other information in the results page. In one approach, search assistant 120 or 220 may identify the particular search engine that a user has chosen to query. Search assistant 120 or 220 may, for example, identify the search engine by querying browser framework 130 or 230 for the URL in its address bar or by reading identifying information in the markup. Then, search assistant 120 or 220 can iterate through each line of markup to identify search results based on known formatting conventions for that particular search engine. For example, search assistant 120 or 220 can search the markup for specific tags (e.g., HTML tags) that are known to indicate search results.

In another approach, search assistant 120 or 220 may parse the markup, regardless of format, to identify search results and to graphically distinguish them from other information in the results page. Even though the markup may generally include numerous segmented components, there typically is no map, or known markers, from which search assistant 120 or 220 can quickly distinguish search results from each other, or from advertisements and other components within the results page. Thus, in embodiments, search assistant 120 or 220 may dynamically analyze the markup to determine the hierarchical structure of a results page. Particularly, search assistant 120 or 220 may look for parallel components, i.e. components that match the pattern of items in a list, based on the reoccurrence of formatting clues.

For example, search assistant 120 or 220 can analyze the structure of the markup (e.g., the HTML Document Object Model) to look for patterns. The markup will often include a hierarchy of elements. Elements are the building blocks of a document or web page and may be defined in a number of ways depending on the markup language. In HTML, elements are identified with opening and closing tags (e.g., <div> and </div>). Elements may encapsulate other elements and may also have ancestors (i.e., elements higher up the same branch of the hierarchy), siblings (i.e., elements at the same level of the hierarchy), and descendants (i.e., elements lower down the same branch of the hierarchy).

Figure 3:
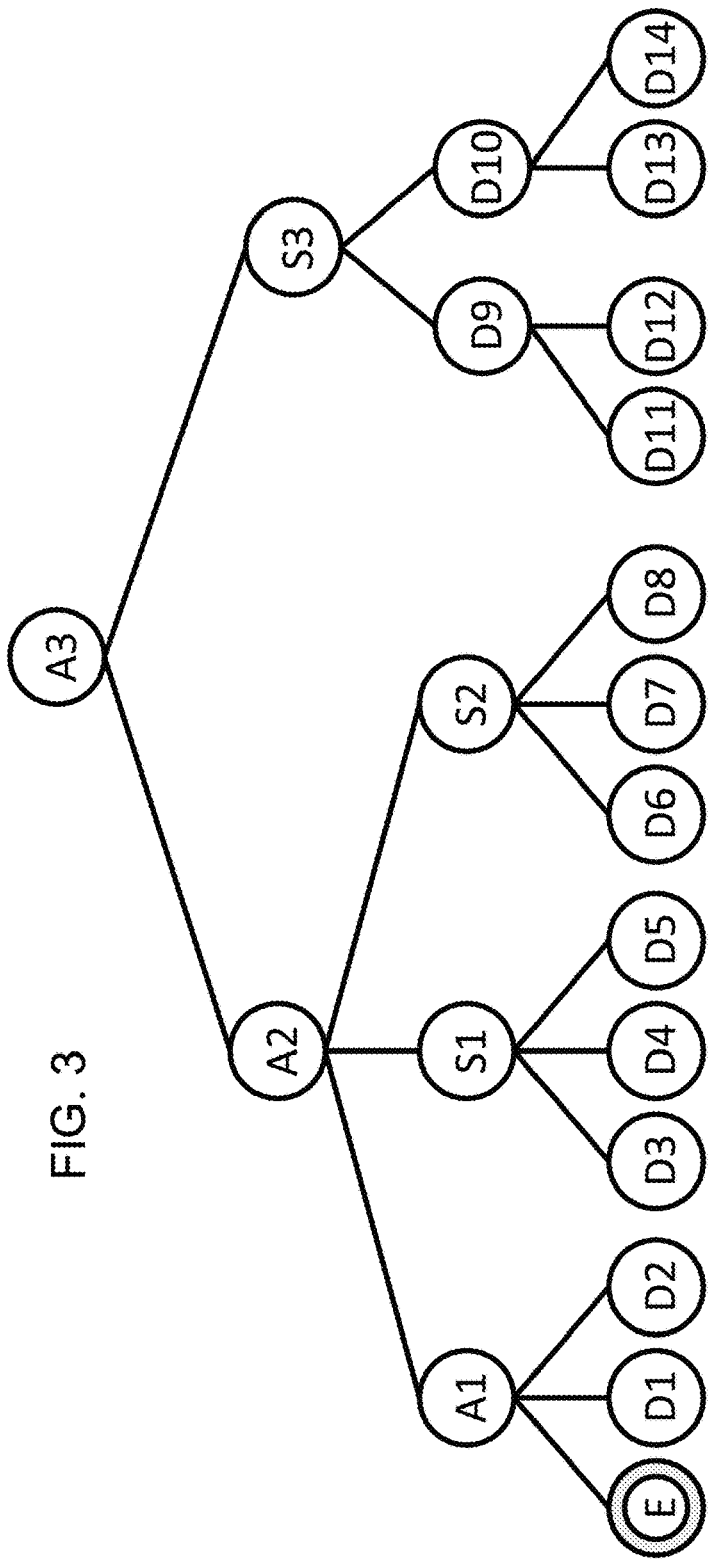
FIG. 3 is a hierarchical diagram of sample HTML elements associated with a set of search results received from a search engine in response to a search request.

FIG. 3 is a hierarchical diagram of sample HTML elements associated with a set of search results received from a search engine in response to a search request. For a given element, search assistant 120 or 220 can first identify each element's ancestors (i.e. each element along the path to the root of the hierarchy). As illustrated in FIG. 3, for a given element E, search assistant 120 or 220 can identify E's ancestors as A1, A2, and A3.

Next, search assistant 120 or 220 can identify a sub-hierarchy for each of the identified ancestors (i.e., the structure that includes each of the ancestors' descendants). In FIG. 3, the sub-hierarchy of A1 includes elements E, D1, and D2, while the sub-hierarchy of A2 includes elements A1, S1, and S2 and each of their descendants. The sub-hierarchy of A3 includes all elements since A3 is the root. Each of these sub-hierarchies can be referred to as ancestor trees of element E.

For each ancestor, search assistant 120 or 220 can identify its siblings and their corresponding sub-hierarchies. In FIG. 3, the siblings of A1 are S1 and S2, while the sibling of A2 is S3. A3 has no siblings since it is the root of the hierarchy. The sibling sub-hierarchies can be referred to as sibling trees—i.e., they are the sibling trees of the ancestor trees of element E.

The search assistant 120 or 220 can next compare each ancestor tree of element E with its corresponding sibling trees and generate a similarity score based on how closely the ancestor tree resembles its sibling trees. Referring to FIG. 3, for example, search assistant 120 or 220 may compare the A1 ancestor tree with the S1 and S2 sibling trees. It may also compare the A2 ancestor tree with the S3 sibling tree.

The similarity score can be based on a number of factors including the degree of resemblance between the structures of the ancestor tree and its sibling trees and also the number of similar sibling trees. For example, an ancestor tree with 10 similar siblings may receive a higher similarity score than an ancestor tree with only 2 similar siblings.

Search assistant 120 or 220 can determine the structural resemblance between an ancestor tree and its sibling trees according to a variety of factors. In embodiments, search assistant 120 or 220 may look at the depth of respective hierarchies of a tree (i.e. the number of levels or "length" of the longest branch in the tree). For example, an ancestor tree with 4 levels of elements may have a low structural similarity to a sibling tree with only 2 levels of elements. Search assistant 120 or 220 may also consider uniformity of depth (i.e. the degree to which each of a tree's branches are the same length). In other words, even if an ancestor tree and a sibling tree have the same depth, they may not be structurally similar if the ancestor tree has 4 branches that are 4 levels deep, while the sibling tree has only 1 branch that is 4 levels deep.

Other factors include the number of descendants and uniformity of descendants at each level of the hierarchy. In other words, search assistant 120 or 220 may consider the extent to which each tree fans out at successive levels of the hierarchy and how uniformly this occurs. Search assistant 120 or 220 may also consider other factors when comparing tree structures without departing from the scope of this invention.

In FIG. 3, the structure of the A1 ancestor tree is identical to the structures of the S1 and S2 sibling trees, while the structure of the A2 ancestor tree is very different from the structure of the S3 sibling tree. The A1 ancestor tree would therefore receive a higher similarity score than the A2 ancestor tree. After search assistant 120 or 220 determines all of the similarity scores, it can identify the ancestor associated with the highest similarity score. That ancestor and its siblings are the elements most likely to represent individual search results (with each of their descendants representing components of search results). In FIG. 3, the A1 ancestor tree would have the highest similarity score, and therefore the A1 ancestor tree and the S1 and S2 sibling trees would most likely represent individual search results.

In embodiments, search assistant 120 or 220 can additionally or alternatively compare ancestor trees to sibling trees by analyzing the properties of the elements within the trees. For example, similar trees may incorporate the same HTML/CSS styles, thereby establishing common formatting (e.g., header level, font, bolding, color, size, etc.) among the trees. Accordingly, the A1 ancestor tree and its S1 and S2 sibling trees might also be identified as individual search results based on common properties.

Once all of the search results have been identified, search assistant 120 or 220 may determine whether any of the search results should be modified or filtered in some manner, as further described below.

Modifying/Presenting Search Results

There are many ways to modify or filter search results to improve the quality of a search. The goal of this description is not to list every possible type of modification, but rather to identify some exemplary approaches to filtering and modifying search results along with some justifications as to why those approaches may be beneficial to a user.

One such approach is premised on the notion of emphasizing (e.g., highlighting, bolding, underlining) or deemphasizing (e.g., graying out, removing, or hiding) search results that a user may or may not be interested in, respectively. Similarly, emphasis may be provided for results that may have some particular significance to the user. For example, a user may have previously indicated that he likes a particular search result by bookmarking or saving a corresponding URL. For example, co-pending U.S. patent application Ser. No. 14/664,166, entitled "Deriving Semantic Relationships Based on Empirical Organization of Content by Users," describes embodiments in which users can save content items to personal folders. The relationships among content items within those personal folders may be used to suggest content items to other users. In conjunction with such embodiments, search assistant 120 or 220 may highlight search results corresponding to content items that a user has previously saved to at least one personal folder and/or provide additional information as suggestions. Alternatively, in some embodiments, search assistant 120 or 220 may remove or hide search results corresponding to content items that a user has already saved.

Figure 4:
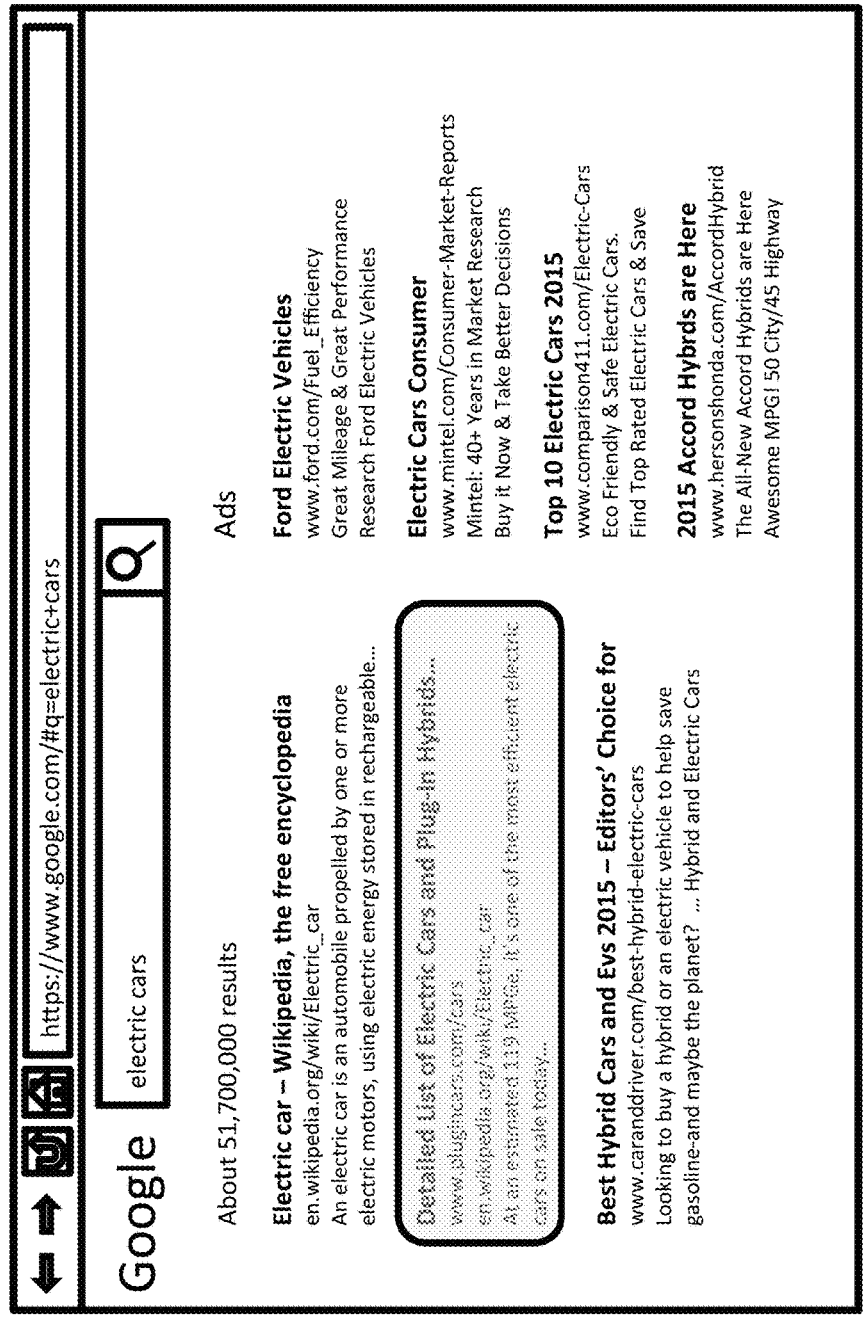
FIG. 4 illustrates an output display from an exemplary embodiment of a search results modulator.

FIG. 4 illustrates a display of output from an exemplary embodiment of a search results modulator, in response to a user's query of a search engine for "electric cars." In FIG. 4, search assistant 120 or 220 has highlighted one of the search results ("Detailed List of Electric Cars and Plug-In Hybrids") that the user had previously saved.

Some other embodiments in which one or more search results may be emphasized or deemphasized by search assistant 120 or 220 include the following: (i) emphasizing search results that a user previously indicated that he liked or were helpful (but did not necessarily "save" the search results); (ii) deemphasizing search results that a user previously indicated that he did not like or did not find helpful; (iii) emphasizing search results that other users have liked or found useful; (iv) deemphasizing search results that other users have disliked or found not to be helpful; (v) emphasizing search results that are very popular based on, for example, the number of times the search results' pages are known to have been visited by other users; and (vi) in conjunction with co-pending U.S. patent application Ser. No. 14/664,166, emphasizing search results that are determined to be suggestions for content items the user has previously saved, or deemphasizing search results that are determined to be poor suggestions for content items the user has previously saved.

In the above embodiments, and others, search results may alternatively or additionally be emphasized or deemphasized based on the content of the search results. For example, a user might establish criteria for content he wishes to see or exclude and/or search assistant 120 or 220 can learn such criteria based on the user's prior interactions, search history, etc. Then, if the content of a search result (e.g., the full text, keywords, title, snippet, images, domain, etc.) matches any of the criteria, the search result can be emphasized or deemphasized accordingly.

In embodiments of the invention, user preferences for search results and/or content can be obtained explicitly (e.g., a user clicks on a button to indicate that he did not like a search result) and/or passively (e.g., a user ignored a search result on one or more prior occasions). Further, it should be understood that the scope of this invention is not limited to any particular types of user information or how that user information is collected or maintained.

In embodiments of the invention, search assistant 120 or 220 can add additional information to be displayed in conjunction with the search results. The additional information can be presented, for example, in empty white space surrounding the search results, in a "tooltip" that appears when the user hovers over the corresponding search result, or in any other suitable manner.

Some embodiments in which additional information can be appended to the display include the following: (i) append suggestions (see co-pending U.S. patent application Ser. No. 14/664,166) for individual search results (e.g., provide a tooltip of one or more suggested content items for each search result); (ii) append suggestions (see co-pending U.S. patent application Ser. No. 14/664,166) based on a set of search results (e.g., provide one or more content items that are suggestions for a whole page of search results); (iii) append user interface elements (e.g., buttons, sliders, text boxes, etc.) to permit the user to operate (e.g., save, hide, share, indicate preferences such as liking or disliking, etc.) on one or more search results; and (iv) append supplementary information about the search results (e.g., the number of users that have saved, visited, etc. each search result, or a rating or score for each search result based on any available metrics or other available information for the search results).

In addition to emphasizing, deemphasizing, and appending additional information about search results, embodiments of the invention can also reorganize the presentation of search results based on, for example, the popularity of the search results or other available metrics/information (e.g., based on domains, criteria, preferences, or user information). In an embodiment, search assistant 120 or 220 can reorganize the search results into one or more folders based on the folder recommendation embodiments described in co-pending U.S. patent application Ser. No. 14/664,166.

In embodiments, regardless of how search results will be presented or additional information will be added, search assistant 120 or 220 can modify the original markup and cause browser framework 130 or 230 to display the search results in accordance with the modified markup. For example, search assistant 120 or 220 can append new information (e.g., by adding a new Cascading Style Sheet or "CSS" classes) to one or more search results. The browser framework 130 or 230 will then provide or update the display to reflect the appended information.

Capturing Information About Search Results

In addition to adding, modifying, and/or reorganizing information to be displayed by browser framework 130 or 230, embodiments of the invention can capture additional information, for example, about the user's search terms, his interaction with search results, and/or his interaction with other information appended to the search results display. Search assistant 120 or 220 may then store captured information locally and/or in a data repository such as data repository 270, and search assistant 120 or 220 and/or search assistant engine 260 may later use this information (in the same or a different form) when processing search results.

In an embodiment, search assistant 120 or 220 may add "triggers" (e.g., JavaScript code) to any received search results, such that when a user selects a particular search result, the trigger returns information to search assistant 120 or 220 about the selected search result and/or the user's search terms. For example, triggers may be appended to search results in the same way as other information.

Computing Device

FIG. 5 is a block diagram of an exemplary embodiment of a computing device 500, in accordance with the present invention, which in certain operative embodiments can comprise, for example, user computer 110, user computer 210, and/or search assistant engine 260. Computing device 500 can comprise any of numerous components, such as for example, one or more network interfaces 510, one or more memories 520, one or more processors 530 including program instructions and logic 540, one or more input/output (I/O) devices 550, and one or more user interfaces 560 that may be coupled to the I/O device(s) 550, etc.

Computing device 500 may comprise any device known in the art that is capable of processing data and/or information, such as any general purpose and/or special purpose computer, including as a personal computer, workstation, server, minicomputer, mainframe, supercomputer, computer terminal, laptop, tablet computer (such as an iPad), wearable computer, mobile terminal, Bluetooth device, communicator, smart phone (such as an iPhone, Android device, or BlackBerry), a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general, any device on which a finite state machine resides that is capable of implementing at least a portion of the methods, structures, API, and/or interfaces described herein may comprise computing device 500. Such a computing device 500 can comprise components such as one or more network interfaces 510, one or more processors 530, one or more memories 520 containing instructions and logic 540, one or more input/output (I/O) devices 550, and one or more user interfaces 560 coupled to the I/O devices 550, etc.

Memory 520 can be any type of apparatus known in the art that is capable of storing analog or digital information, such as instructions and/or data. Examples include a non-volatile memory, volatile memory, Random Access Memory (RAM), Read Only Memory (ROM), flash memory, magnetic media, hard disk, solid state drive, floppy disk, magnetic tape, optical media, optical disk, compact disk, CD, digital versatile disk, DVD, and/or RAID array, etc. The memory device can be coupled to a processor and/or can store instructions adapted to be executed by processor, such as according to an embodiment disclosed herein.

Input/output (I/O) device 550 may comprise any sensory-oriented input and/or output device known in the art, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, vibrator, tactile simulator, and/or tactile pad, optionally including a communications port for communication with other components in computing device 500.

Instructions and logic 540 may comprise directions adapted to cause a machine, such as computing device 500, to perform one or more particular activities, operations, or functions. The directions, which can sometimes comprise an entity called a "kernel", "operating system," "program," "application," "utility," "subroutine," "script," "macro," "file," "project," "module," "library," "class," "object," or "Application Programming Interface," etc., can be embodied as machine code, source code, object code, compiled code, assembled code, interpretable code, and/or executable code, etc., in hardware, firmware, and/or software. Instructions and logic 540 may reside in processor 530 and/or memory 520.

Network Interface 510 may comprise any device, system, or subsystem capable of coupling an information device to a network. For example, network interface 510 can comprise a telephone, cellular phone, cellular modem, telephone data modem, fax modem, wireless transceiver, Ethernet circuit, cable modem, digital subscriber line interface, bridge, hub, router, or other similar device.

Processor 530 may comprise a device and/or set of machine-readable instructions for performing one or more predetermined tasks. Processor 530 can comprise any one or a combination of hardware, firmware, and/or software. Processor 530 can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. Processor 530 may comprise a central processing unit (CPU), local controller, remote controller, parallel controller, and/or distributed controller, etc. Processor 530 may also comprise a general-purpose device, such as a microcontroller and/or a microprocessor. In certain embodiments, processor 530 may comprise a dedicated-purpose device, such as an Application Specific Integrated Circuit (ASIC) or a Field Programmable Gate Array (FPGA) that has been designed to implement in its hardware and/or firmware at least a part of an embodiment disclosed herein.

User interface 560 may comprise any device and/or means for rendering information to a user and/or requesting information from the user. User interface 560 may include, for example, at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. User interface 560 can include one or more textual elements such as, for example, one or more letters, number, symbols, etc. User interface 560 can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, auto-sizing, position, and/or dimension, etc. User interface 560 can include one or more audio elements such as, for example, a volume control, pitch control, speed control, voice selector, and/or one or more elements for controlling audio play, speed, pause, fast forward, reverse, etc. User interface 560 can include one or more video elements such as, for example, elements controlling video play, speed, pause, fast forward, reverse, zoom-in, zoom-out, rotate, and/or tilt, etc. User interface 560 can include one or more animation elements such as, for example, elements controlling animation play, pause, fast forward, reverse, zoom-in, zoom-out, rotate, tilt, color, intensity, speed, frequency, appearance, etc. User interface 560 can include one or more haptic elements such as, for example, elements utilizing tactile stimulus, force, pressure, vibration, motion, displacement, temperature, etc.

The present invention can be realized in hardware, software, or a combination of hardware and software. The invention can be realized in a centralized fashion in one computer system, or in a distributed fashion where different elements are spread across several computer systems. Any kind of computer system or other apparatus adapted for carrying out the methods described herein is suitable.

The present invention can be embedded in a computer program product, such as a computer-readable storage medium or device, which when loaded into a computer system is able to carry out the different methods described herein. "Computer program" in the present context means any expression, in any language, code or notation, of a set of instructions intended to cause a system having an information processing capability to perform a particular function either directly or indirectly after either or both of the following: (a) conversion to another language, code or notation; or (b) reproduction in a different material form.

CONCLUSION

Although the present disclosure provides certain embodiments and applications, other embodiments apparent to those of ordinary skill in the art, including embodiments that do not provide all of the features and advantages set forth herein, are also within the scope of this disclosure.

The foregoing disclosure has been set forth merely to illustrate the invention and is not intended to be limiting. It will be appreciated that modifications, variations and additional embodiments are covered by the above teachings and within the purview of the appended claims without departing from the spirit and intended scope of the invention. Other logic may also be provided as part of the exemplary embodiments but are not included here so as not to obfuscate the present invention. Since modifications of the disclosed embodiments incorporating the spirit and substance of the invention may occur to persons skilled in the art, the invention should be construed to include everything within the scope of the appended claims and equivalents thereof.

The invention claimed is:

1. A computer-readable storage media having computer-executable instructions embodied thereon, that, when executed perform a method within a browser framework for modulating a display of search results, the method comprising:
receiving, from an Internet search engine, markup language instructions comprising a plurality of search results;
identifying a plurality of sub-hierarchies of elements within the markup language instructions;
determining that two or more of the sub-hierarchies of elements sufficiently resemble each other by performing at least one operation selected from the group of:
comparing a depth of each of the two or more sub-hierarchies of elements,
comparing a uniformity of depth of each of the two or more sub-hierarchies of elements,
comparing a number of descendants of each of the two or more sub-hierarchies of elements,
comparing a uniformity of descendants of each of the two or more sub-hierarchies of elements, and
comparing one or more style properties of the elements within each of the two or more sub-hierarchies of elements;
determining that each of the two or more sub-hierarchies of elements correspond to individual search results from the plurality of search results;
querying a data repository based on at least a first search result selected from the individual search results;
receiving, from the data repository, additional information about the first search result;
modifying the markup language instructions based on the additional information; and
causing the browser framework to render the modified markup language instructions in a display to a user.

2. The method of claim 1, wherein determining that two or more of the sub-hierarchies of elements sufficiently resemble each other includes calculating a similarity score.

3. The method of claim 1, wherein querying the data repository based on the first search result includes transmitting, via a network, a uniform resource locator of the first search result to the data repository.

4. The method of claim 3, wherein the uniform resource locator of the first search result is a canonical uniform resource locator.

5. The method of claim 1, wherein querying the data repository based on the first search result includes transmitting, via a network, at least one of a pathname, a title, an author, a date, and/or a checksum of the first search result to the data repository.

6. The method of claim 1, wherein modifying the markup language instructions based on the additional information includes adding at least one of highlighting, holding, or underlining to the markup language instructions in order to emphasize the first search result.

7. The method of claim 6, wherein the additional information indicates that the user previously expressed interest in the first search result.

8. The method of claim 6, wherein the additional information indicates that the user previously saved the first search result.

9. The method of claim 6, wherein the additional information indicates that the first search result is a suggested result for the user.

10. The method of claim 1, wherein modifying the markup language instructions based on the additional information includes removing the first search result from the markup language instructions.

11. The method of claim 10, wherein the additional information indicates that the user previously disliked or ignored the first search result.

12. The method of claim 1, wherein modifying the markup language instructions based on the additional information includes adding the additional information to the markup language instructions.

13. The method of claim 12, wherein the additional information includes one or more suggested results based on the first search result.

14. The method of claim 12, wherein the additional information includes one or more of a number of users that have saved the first search result, a rating of the first search result, and a score of the first search result.

15. The method of claim 1, wherein modifying the markup language instructions based on the additional information includes adding one or more user interface elements to the markup language instructions, wherein the user interface elements are selected from the group of buttons, sliders, and text boxes.

16. The method of claim 15, wherein the user interface elements enable the user to perform one or more actions on the first search result, wherein the actions are selected from the group of saving, liking, disliking, and sharing the first search result.

17. The method of claim 1, wherein modifying the markup language instructions based on the additional information includes changing the location in which the first search result appears among the plurality of search results.

18. The method of claim 1, wherein modifying the markup language instructions based on the additional information includes adding a folder element to the markup language instructions and associating the first search result with the folder element.

19. The method of claim 1, wherein modifying the markup language instructions based on the additional information includes adding a new style sheet and/or one or more new style sheet classes to the markup language instructions.

20. A system for modulating a display of search results comprising:
a search assistant engine executing on a server computer; and
a search assistant executing on a user's computing device, wherein the search assistant comprises instructions that when executed by a processor on the user's computing device cause the search assistant to:
receive, from an Internet search engine, markup language instructions comprising a plurality of search results;
identify a plurality of sub-hierarchies of elements within the markup language instructions;
determine that two or more of the sub-hierarchies of elements sufficiently resemble each other by performing at least one operation selected from the group of:
compare a depth of each of the two or more sub-hierarchies of elements,
compare a uniformity of depth of each of the two or more sub-hierarchies of elements,
compare a number of descendants of each of the two or more sub-hierarchies of elements,
compare a uniformity of descendants of each of the two or more sub-hierarchies of elements, and compare one or more style properties of the elements within each of the two or more sub-hierarchies of elements;
determine that each of the two or more sub-hierarchies of elements correspond to individual search results from the plurality of search results;
query, via a network, the search assistant engine based on at least a first search result selected from the individual search results;
receive, from the search assistant engine, additional information about the first search result;
modify the markup language instructions based on the additional information; and render the modified markup language instructions in a display to the user.

21. The system of claim 20, wherein the search assistant further comprises instructions that when executed cause the search assistant to determine that two or more of the sub-hierarchies of elements sufficiently resemble each other by calculating a similarity score.

22. The system of claim 20, wherein the search assistant further comprises instructions that when executed cause the search assistant to query the data repository based on the first search result by transmitting, via a network, a uniform resource locator of the first search result to the data repository.

23. The system of claim 22, wherein the uniform resource locator of the first search result is a canonical uniform resource locator.

24. The system of claim 20, wherein the search assistant further comprises instructions that when executed cause the search assistant to query the data repository based on the first search result by transmitting, via a network, at least one of a pathname, a title, an author, a date, and/or a checksum of the first search result to the data repository.

25. The system of claim 20, wherein the search assistant further comprises instructions that when executed cause the search assistant to modify the markup language instructions based on the additional information by adding at least one of highlighting, holding, or
   underlining to the markup language instructions in order to emphasize the first search result.

26. The system of claim 25, wherein the additional information indicates that the user previously expressed interest in the first search result.

27. The system of claim 26, wherein the additional information indicates that the user previously saved the first search result.

28. The system of claim 26, wherein the additional information indicates that the first search result is a suggested result for the user.

29. The system of claim 20, wherein the search assistant further comprises instructions that when executed cause the search assistant to modify the markup language instructions based on the additional information by removing the first search result from the markup language instructions.

30. The system of claim 29, wherein the additional information indicates that the user previously disliked or ignored the first search result.

31. The system of claim 20, wherein the search assistant further comprises instructions that when executed cause the search assistant to modify the markup language instructions based on the additional information by adding the additional information to the markup language instructions.

32. The system of claim 31, wherein the additional information includes one or more suggested results based on the first search result.

33. The system of claim 31, wherein the additional information includes one or more of a number of users that have saved the first search result, a rating of the first search result, and a score of the first search result.

34. The system of claim 20, wherein the search assistant further comprises instructions that when executed cause the search assistant to modify the markup language instructions based on the additional information by adding one or more user interface elements to the markup language instructions, wherein the user interface elements are selected from the group of buttons, sliders, and text boxes.

35. The system of claim 34, wherein the user interface elements enable the user to perform one or more actions on the first search result, wherein the actions are selected from the group of saving, liking, disliking, and sharing the first search result.

36. The system of claim 20, wherein the search assistant further comprises instructions that when executed cause the search assistant to modify the markup language instructions based on the additional information by changing the location in which the first search result appears among the plurality of search results.

37. The system of claim 20, wherein the search assistant further comprises instructions that when executed cause the search assistant to modify the markup language instructions based on the additional information by adding a folder element to the markup language instructions and associating the first search result with the folder element.

38. The system of claim 20, wherein the search assistant further comprises instructions that when executed cause the search assistant to modify the markup language instructions based on the additional information by adding a new style sheet and/or one or more new style sheet classes to the markup language instructions.

* * * * *